Aug. 18, 1931.   C. ERICKSON   1,819,548
VEHICLE SNUBBER
Filed Sept. 7, 1929
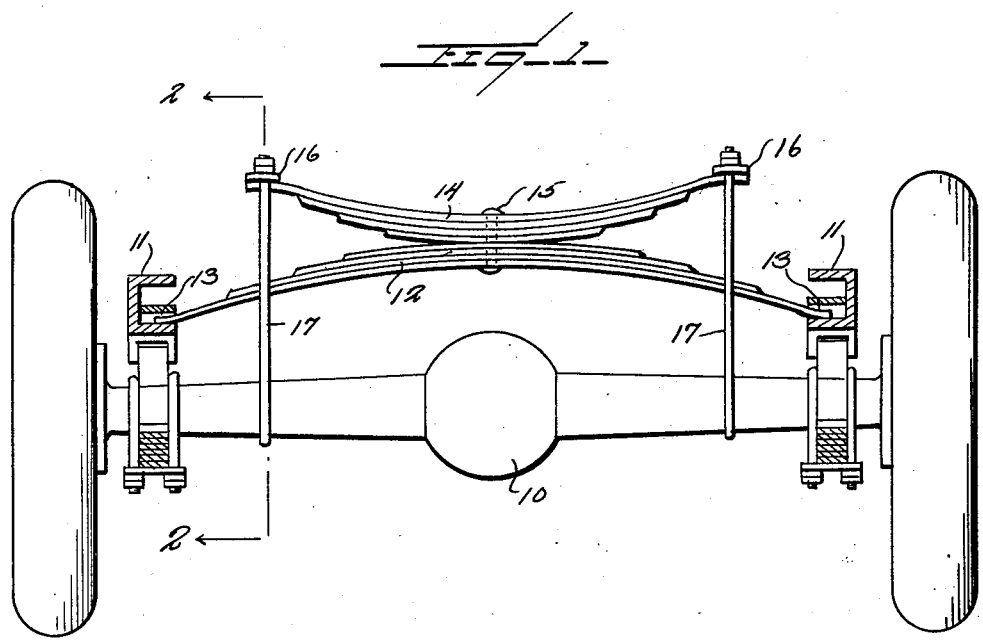
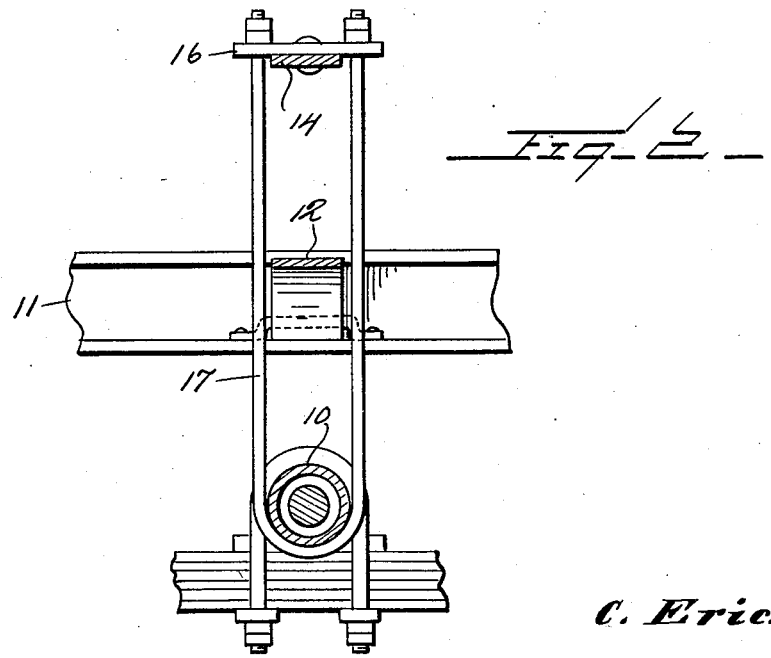
Inventor
C. Erickson
By Watson E. Coleman
Attorney Patented Aug. 18, 1931

1,819,548

UNITED STATES PATENT OFFICE

CHARLES ERICKSON, OF ST. CLOUD, MINNESOTA

VEHICLE SNUBBER

Application filed September 7, 1929. Serial No. 391,014.

This invention relates to snubbing devices such as are used in connection with automobiles for the purpose of snubbing or dampening the action of the springs and the general object of the invention is to provide a very simple snubber of this character which has been found thoroughly effective in practice, which is easily applied to a car and which is relatively cheap.

My invention is illustrated in the accompanying drawings, wherein:—

Figure 1 is a transverse sectional view through a motor car of standard construction showing my improved snubber applied thereto, the snubber being shown in elevation;

Figure 2 is a section on the line 2—2 of Figure 1.

Referring to the drawings, 10 designates the rear axle housing of a motor car and 11 the frame beams of the chassis. Resting upon the frame beams and extending across the same above the axle thereof is an upwardly bowed spring 12 having its ends attached at 13 to the flanges of the car frame 11. This spring 12 is formed of a plurality of successively shorter leaves.

Resting upon the top of the spring 12 is a reversely curved or bowed spring 14 which is connected to the spring 12 at its middle by means of a bolt 15. The upper leaf or spring 14 of the snubber carries a cross piece 16 apertured at opposite points and to which the legs of the U-bolt 17 are connected, this U-bolt passing beneath the axle housing 10. It will be seen that any upward movement of the chassis is resisted by the springs 12 and by the downwardly bowed springs 14, but the downward movement of the chassis is permitted by reason of the fact that the extremities of the upper member 14 of the snubber are loosely connected to the axle by means of the U-bolts 17.

While I have illustrated certain details of construction, I do not wish to be limited thereto, as it is obvious that slight changes can be made without departing from the spirit of the invention as defined in the appended claims.

I claim:—

1. In a vehicle having an axle and a chassis and springs supporting the chassis from the axle, a snubber comprising a transversely extending upwardly bowed spring having its ends attached to the vehicle frame and a downwardly bowed spring superposed upon the upwardly bowed spring and connected therewith at the middle, the last named spring at its ends having shackles loosely engaging beneath the axle, said shackles permitting upward movement of the axle relative to the first named spring and limiting upward movement of the ends of the second named spring relative to the axle.

2. A snubber of the character described comprising an upwardly bowed spring formed of laminated leaves, the ends of the spring being adapted to be engaged with the frame bars of a vehicle chassis, and a downwardly bowed spring resting at its middle against the upwardly bowed spring and engaging therewith, the extremities of the downwardly bowed spring being operatively connected to the legs of downwardly extending U-bolts constituting shackles and adapted to pass around an axle, the bolts having nuts thereon whereby to adjustably limit the upward movement of the second named spring with relation to the axle.

In testimony whereof I hereunto affix my signature.

CHARLES ERICKSON.